United States Patent
Nakai et al.

[11] Patent Number: 5,930,437
[45] Date of Patent: Jul. 27, 1999

[54] OPTICAL FILTER WITH PLANAR OPTICAL WAVEGUIDE HAVING PERIODICALLY VARIED DISTRIBUTION OF REFRACTIVE INDEX AND PRODUCTION PROCESS THEREOF

[75] Inventors: Michihiro Nakai; Kensuke Shima, both of Sakura; Hiroshi Hidaka, Yotsukaidoh; Satoshi Okude, Sakura; Masaaki Sudoh, Sakura; Tetsuya Sakai, Sakura; Akira Wada, Sakura; Ryozo Yamauchi, Sakura, all of Japan

[73] Assignee: Fujikura Ltd., Tokyo, Japan

[21] Appl. No.: 08/825,912

[22] Filed: Apr. 2, 1997

[30] Foreign Application Priority Data

May 24, 1996 [JP] Japan .................... 8-130281

[51] Int. Cl.⁶ .................................................. G02B 6/10
[52] U.S. Cl. .................................................. 385/129
[58] Field of Search .................... 385/37, 130, 11, 385/14, 27; 333/208, 214, 212; 359/115, 120

[56] References Cited

U.S. PATENT DOCUMENTS

| | | | |
|---|---|---|---|
| 3,891,302 | 6/1975 | Dabby et al. | 350/96 |
| 4,598,262 | 7/1986 | Chen | 333/208 |
| 5,638,473 | 6/1997 | Byron | 385/37 |
| 5,717,799 | 2/1998 | Robinson | 385/37 |

FOREIGN PATENT DOCUMENTS

| | | |
|---|---|---|
| 55115002 | 9/1980 | European Pat. Off. . |
| 62145208 | 6/1987 | European Pat. Off. . |
| 0560412 | 9/1993 | European Pat. Off. . |
| 0610032 | 4/1994 | European Pat. Off. . |
| 08043654 | 2/1996 | European Pat. Off. . |
| 7281016 | 10/1995 | Japan . |

OTHER PUBLICATIONS

Vincent V. Wong et al.; "Ridge–Waveguide Sidewall–Grating Distributed Feedback Structures Fabricated By X–Ray Lithography"; Journal of Vacuum Science and Technology, Part B, vol. 11 No. 6, Nov. 1, 1993; pp. 2621–2624.

*Primary Examiner*—Akm E. Ullah
*Attorney, Agent, or Firm*—Sughrue, Mion, Zinn, Macpeak & Seas, PLLC

[57] ABSTRACT

Core comprises a main stem which is formed on a substrate, linearly extending in the beam propagating direction and short branches with a certain length which extend perpendicularly to the beam propagating direction toward both sides along the plane of the substrate and are arranged at regular intervals in the beam propagating direction. Thus, the branches are arranged in a ladder geometry when it is viewed from the top, forming a rectangular waveform arrangement. The core constitutes a grating structure in which the width of the core is made to vary periodically with the branches in the beam propagating direction.

8 Claims, 6 Drawing Sheets

Reflection type
Mode coupling 32 step in total

OPTICAL FILTER WITH PLANAR OPTICAL WAVEGUIDE HAVING PERIODICALLY VARIED DISTRIBUTION OF REFRACTIVE INDEX AND PRODUCTION PROCESS THEREOF

BACKGROUND OF THE INVENTION (1) Field of the Invention

The present invention relates to an optical device, in particular relating to an optical waveguide filter and a production process thereof.

(2) Description of the Prior Art

Conventionally, a fiber grating producing method has been the technology used for producing devices for wavelength filters in a fiber.

In general, gratings have two types, namely, radiation gratings and reflection gratings. As shown in FIG. 1, the former couples the mode ($\beta$) that propagates through the core, with the cladding mode ($\beta$clad); the latter couples the mode ($\beta$) that propagates in the positive direction through the core, with the mode ($\beta$ref) that propagates in the negative direction. This coupling is enabled by a perturbation arising in the core.

In a typical optical fiber, this perturbation is caused by variation in refractive index. The variation in refractive index occurs periodically at intervals of some 100 $\mu$m for a radiation type, and at intervals of about 1 $\mu$m for a reflection type so as to allow coupling between the modes.

For a grating in a planar waveguide, variation in refractive index of the core was formed after the production of the waveguide. As seen in Japanese Patent Application Laid-Open Hei 7 No. 281,016, for example, for a reflection type waveguide, variation in refractive index of the core is formed after the production of the waveguide. In this publication, as shown in FIG. 2A, a waveguide is formed of a core a and a cladding b. This is modified by the addition of some impurity such as germanium (Ge) oxide etc. The resultant is illuminated across a prescribed range c with ultraviolet light with interference fringes, so as to produce a diffraction grating in which the refractive indices of core a and cladding b within the prescribed range c are changed periodically in the beam propagating direction, as shown in FIG. 2B.

Up to now, however, no radiation grating has been reported to be successfully produced using a planar waveguide because of difficulties in its fabrication etc., as will be described next. In the conventional art, silica substrates were usually used. When the refractive index was modified after the production of the waveguide, the substrate was left for some days in a hydrogen gas atmosphere under a pressure of 100 atm so as to diffuse hydrogen into the silica, thus causing variation in refractive index of the core. That is, this process needed several days after the production of waveguide chips.

Since the presence of hydrogen increases the refractive indices of the cladding and core, the properties of the grating change some days after its production. This change should be taken into account when it is fabricated.

For a radiation grating, the grating pitch is of some 100 $\mu$m, but it is difficult to control the wavelength center (within 1 nm) unless the accuracy of forming the grating is of sub-micron level.

The mask for ultraviolet light to be used for a photolithographic process, will be damaged by ultraviolet irradiation. This limits the material for the mask. That is, chromous masks, which are used for semiconductor processes etc., can not be used. Further, the thickness of the mask should be made large considering the damage by the irradiation. From this requirement, the accuracy in the fabrication of the masks of stainless steel which are now commonly used is of ±5 $\mu$m.

Even if the accuracy of the mask was within 1 $\mu$m, it is still difficult to control the wavelength center if the energy density of ultraviolet light is poor in its uniformity. Further, other than the wavelength center, if there is degradation of constituent parameters for each part of the grating, the inhibiting band of the grating becomes wider, making it impossible to obtain the designated band width.

When the reflecting and absorbing performances of the substrate are considered, silica is most preferable for the material of the substrate. For example, when a Si-substrate was used, abrasion damage occurred due to the processing by laser with an energy density of 1 mJ/mm$^2$. In order to prevent this, it is necessary to reduce the energy density to ⅕ of the present level.

For the case of a planar waveguide, since the area of it is greater than that of the fiber, the number of chips which can be produced per each laser irradiation is limited to five or below (for a fiber, 30 or more can be produced).

SUMMARY OF THE INVENTION

The present invention has been devised in order to solve the conventional problems described above, and it is therefore an object of the invention to provide an optical waveguide filter and a production process thereof wherein a grating for a planar waveguide can be produced in a reduced processing time with high processing accuracy while the substrate can be formed of a material which is selected from a wide variation and is controllable to produce a free shape.

In order to achieve the above object, the present invention has configurations as follows:

In accordance with the first aspect of the invention, an optical waveguide filter having a planar optical waveguide in which an optical waveguide is formed along a substrate, is characterized in that the optical waveguide has a grating structure in which the width of the waveguide is varied periodically in the beam propagating direction.

Next, the second aspect of the invention resides in an optical waveguide filter having the above first feature, wherein the optical waveguide is structured of a core along the substrate and a cladding enclosing the core.

The third aspect of the invention resides in an optical waveguide filter having the above second feature, wherein the core is mainly composed of SiO$_2$ to which one or more than one kind of substances such as GeO$_2$, B$_2$O$_3$, P$_2$O$_5$ and the like are added in appropriate amounts.

The fourth aspect of the invention resides in an optical waveguide filter having the above second feature, wherein the cladding is mainly composed of SiO$_2$ to which one or more kinds of substances such as B$_2$O$_3$, P$_2$O$_5$ and the like are added in appropriate amounts.

The fifth aspect of the invention resides in an optical waveguide filter having the above second feature, wherein the cladding has a lower refractive index than the core.

In accordance with the sixth aspect of the invention, a production process of an optical waveguide filter whereby a planar waveguide is produced by forming an optical waveguide along a substrate, includes: an optical waveguide forming step for creating a core to be an optical waveguide having a grating structure in which the width of the core is varied periodically in the beam propagating direction; and a waveguide embedding step for covering the formed core with a cladding having a lower refractive index than the core so as to allow the core to be an optical waveguide.

The seventh aspect of the invention resides in a production process of an optical waveguide filter having the above sixth feature, comprising the steps of:

using a Si-wafer as the substrate;

depositing glass soot on the wafer by flame hydrolysis deposition (FHD);

sintering the deposited glass soot to form a cladding glass layer;

forming a Si-resist film over the cladding glass layer by Ar-sputtering deposition;

forming a core pattern by photolithography;

forming a core by reactive ion etching (RIE); and filling a cladding around and over the core to embed the core by the same FHD and sintering process.

The eighth aspect of the invention resides in a production process of an optical waveguide filter having the above sixth feature, wherein the optical waveguide has a grating structure in which the width of the waveguide is varied periodically in a rectangular waveform arrangement in the beam propagating direction.

The ninth aspect of the invention resides in a production process of an optical waveguide filter having the above sixth feature, wherein the optical waveguide has a grating structure in which the width of the waveguide is varied sinusoidally in a trigonometric functional manner in the beam propagating direction.

The tenth aspect of the invention resides in a production process of an optical waveguide filter having the above sixth feature, wherein, in forming the grating structure having a core to be an optical waveguide, the core of the waveguide is cut through by forming a plurality of slits along planes which are perpendicular to the beam propagating direction, at intervals of an arbitrary distance to form an intermittent configuration.

The eleventh aspect of the invention resides in a production process of an optical waveguide filter having the above sixth feature, wherein the grating structure formed is of radiation type.

The twelfth aspect of the invention resides in a production process of an optical waveguide filter having the above sixth feature, wherein the grating structure formed is of reflection type.

In accordance with the invention, without producing a grating after a waveguide has been formed as in the conventional method, a waveguide is shaped into a grating structure by varying the width of the waveguide core periodically in the beam propagating direction so that the effective refractive index of the waveguide core changes periodically. Accordingly, without modifying the fabrication process of waveguides, it is possible to produce gratings.

BRIEF DESCRIPTION OF THE DRAWINGS

FIG. 2A shows formation of a conventional waveguide and FIG. 2B shows production of variation in refractive index of the core after the formation of the conventional waveguide;

DESCRIPTION OF THE PREFERRED EMBODIMENT

The embodiment of the invention will be described in detail with reference to the accompanying drawings.

Figure 3A:
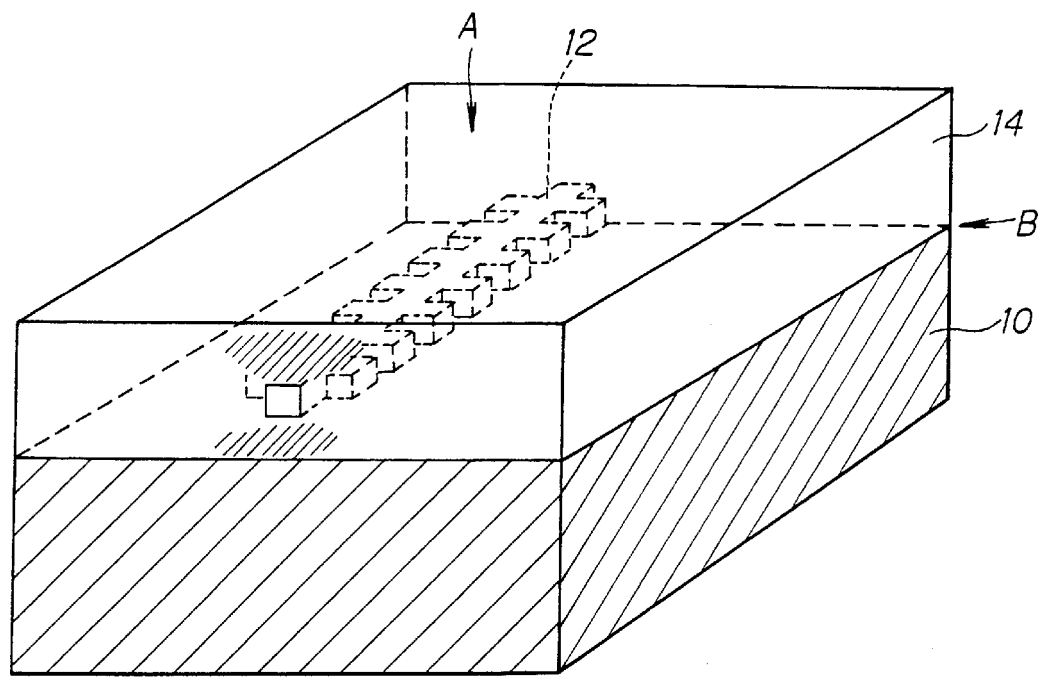
FIG. 3A is a perspective view showing an optical waveguide filter in accordance with the embodiment of the invention.
Figure 3B:
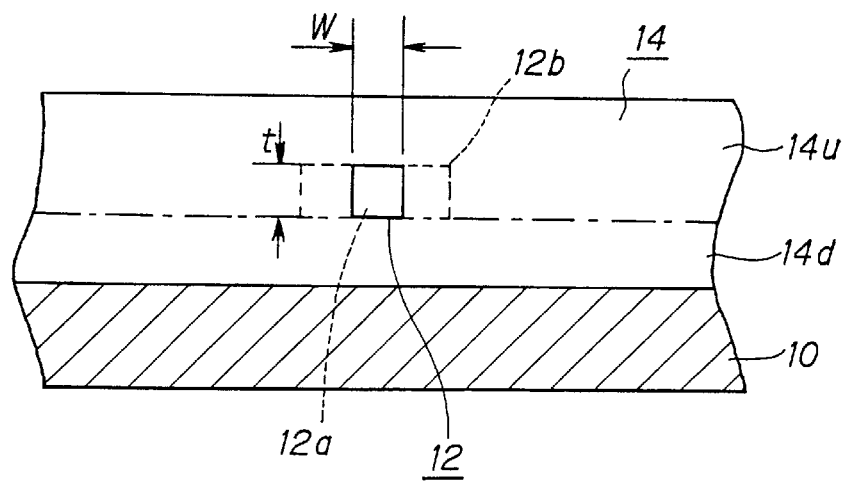
FIG. 3B is a front view showing an optical waveguide filter in accordance with the embodiment of the invention.
Figure 4A:
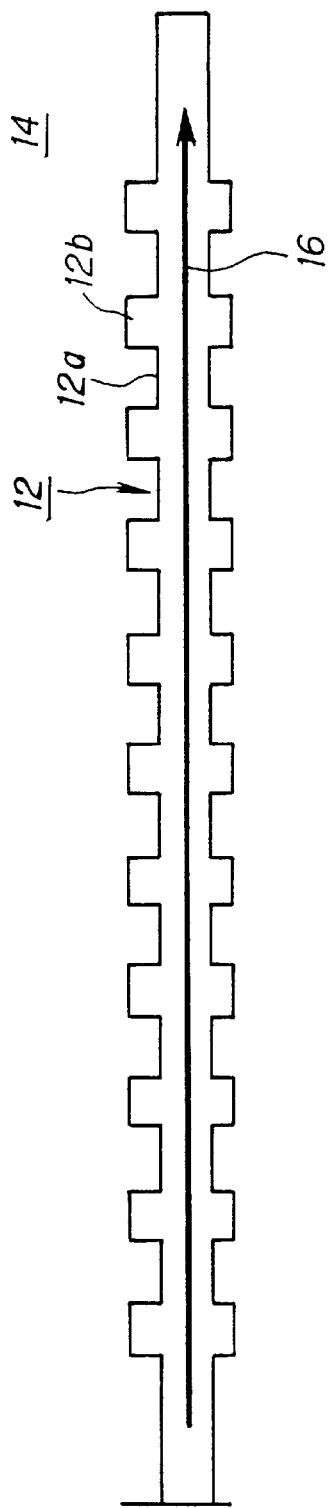
FIG. 4A is a plan view for illustrating the structure of the optical waveguide filter shown in FIGS. 3A and 3B.
Figure 4B:
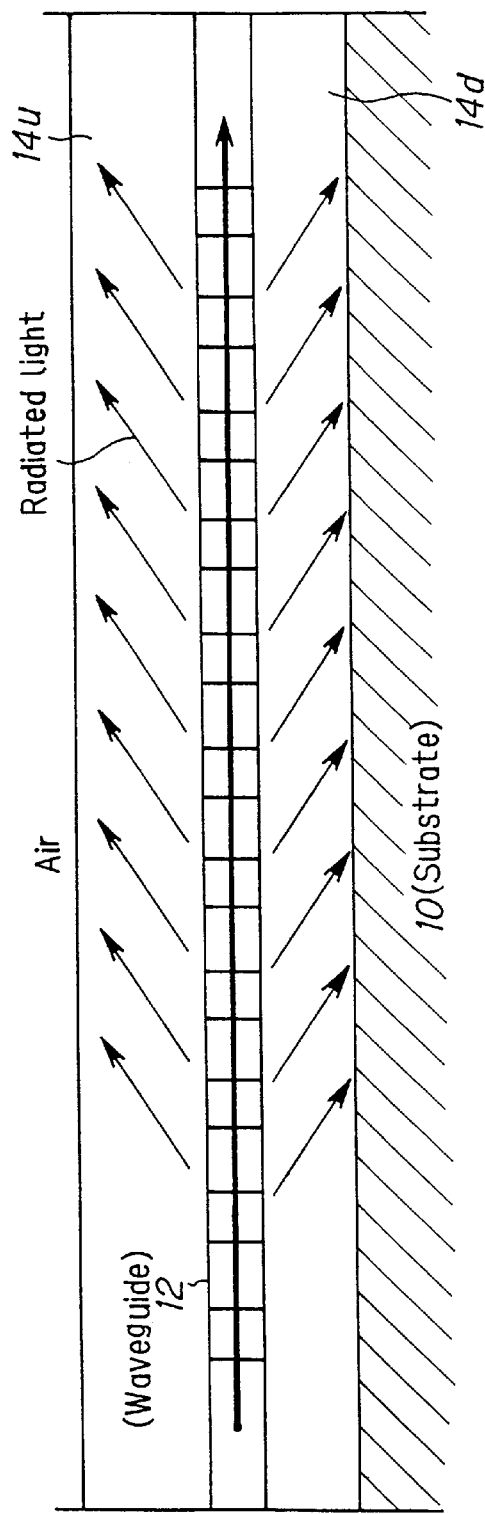
FIG. 4B is a side view for illustrating the structure of the optical waveguide filter shown in FIGS. 3A and 3B.

FIGS. 3A and 3B are perspective and front views showing an optical waveguide filter in accordance with the embodiment of the invention. FIGS. 4A and 4B are plan and side views for illustrating the structure of the same filter.

As shown in FIGS. 3A and 3B and FIGS. 4A and 4B, this optical waveguide filter is a planar optical waveguide in which a core 12 provided along a substrate 10 is enclosed by a cladding 14 forming an optical waveguide. Core 12 is configured in such a manner that the width periodically changes in beam propagating direction 16, thus forming a grating structure.

The material of substrate 10 is not limited to silica but may use silicon (Si) or other various kinds of material.

Core 12 comprises a main stem 12a which is formed on substrate 10, linearly extending in the beam propagating direction and short branches 12b with a certain length which extend perpendicularly to the beam propagating direction toward both sides along the plane of the substrate and are arranged at regular intervals in the beam propagating direction. Thus, branches 12b are arranged in a ladder geometry when it is viewed from the top, forming a rectangular waveform arrangement. In this way, core 12 of this embodiment constitutes a grating structure in which the width of core 12 is made to vary periodically in the beam propagating direction with branches 12b.

Concerning the materials, as an example, core 12 is mainly composed of silica ($SiO_2$) to which one or more than one kind of substances such as $GeO_2$, $B_2O_3$, $P_2O_5$ etc., are added in appropriate amounts. Cladding 14 comprises an upper cladding 14u (upper part of core 12 inclusive of the side parts of the core) and a lower cladding 14d; both parts are mainly composed of silica ($SiO_2$) to which one or more kinds of substances such as $B_2O_3$, $P_2O_5$ etc., are added in appropriate amounts. The quantities, combination or the like, of the added components to core 12 as well as to cladding 14 should not be particularly limited, but can be selected arbitrarily in conformity with the use, etc. The refractive index of cladding 14 is set lower than that of core 12 (e.g., $\Delta \approx 0.3\%$ for the core relative to the cladding). In the embodiment of FIG. 3B, when, as an example, substrate 10 has a thickness of 1 mm and the core main stem 12a has dimensions of 8 $\mu$m×8 $\mu$m (height (t)×width (w)), then the loss of waves transmitted can be suppressed less than 0.1 dB/cm (1.30 $\mu$m). Any of the above specifications are mere examples, and it is, needless to say, possible to properly designate specifications within the scope of the invention in accordance with the characteristics and performance demanded.

Referring next to FIGS. 5A–5D, the production process of the optical waveguide filter of the embodiment will be described.

Figure 5A:
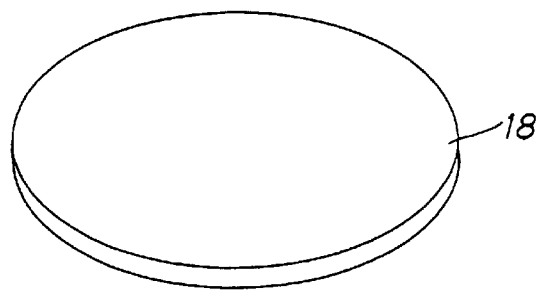
FIGS. 5A–5D are illustrative views showing the production process of an optical waveguide filter in accordance with the embodiment.
Figure 5B:
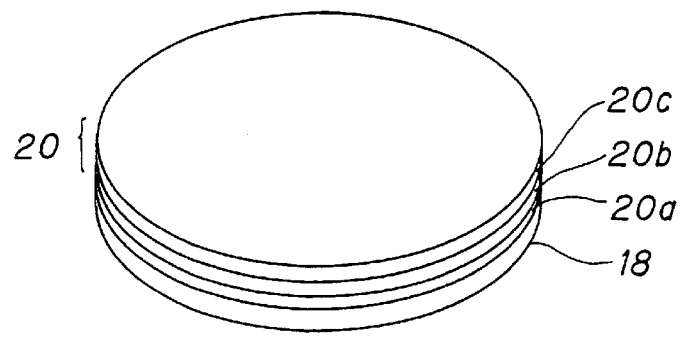

First, as shown in FIG. 5A, a Si-wafer 18 to be a substrate 10 is subjected to the RCA cleansing (silicon surface cleansing). Then, as shown in FIG. 5B, a two-layered slab glass 20 is laminated and solidified on wafer 18. In this case, glass soot is deposited on wafer 18 by the FHD (flame hydrolysis deposition) method and then the wafer 18 with glass soot deposited thereon is sintered under a helium (He) and oxygen ($O_2$) atmosphere at a temperature of 1290° C. to form a transparent glass layer (composed of cladding glass layer 20a and a core glass layer 20b) on wafer 18. Then, a Si-resist film 20c is formed over the transparent glass layer by Ar-sputtering deposition.

Figure 5C:
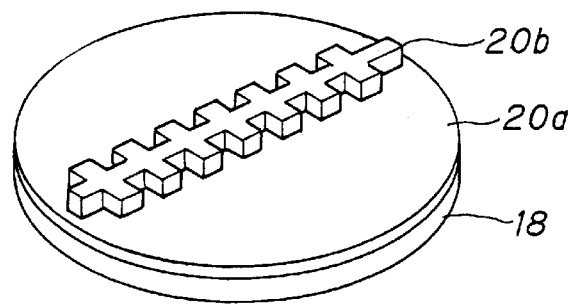

Subsequently, the wafer is patterned and processed by the well-known photolithographic method forming a waveguide core as shown in FIG. 5C. In this case, after wafer 18 is cleaned, a core pattern shown in FIGS. 3A, 3B, FIGS. 4A and 4B is formed on the top layer of the glass 20, or the inorganic resist film, then this is subjected to reactive ion etching (RIE) thereby forming core 12 which has periodically arranged rectangular projections on both sides.

Figure 5D:
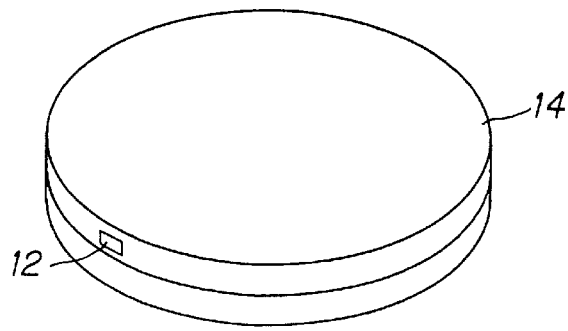

Next, as shown in FIG. 5D, the surrounding and upper layer of core 12 is filled up with cladding 14 similarly by the FHD method and sintering (filling and sintering process). This cladding 14, either upper or lower portion, is formed with a refractive index which is lower than that of core 12, thus allowing the embedded core 12 itself to form an optical waveguide of a grating structure.

Wafer 18 in which a waveguide has been formed with core 12 as stated above, is cut on its periphery into a required shape as the filter, forming the product, an optical waveguide filter.

Figure 1:
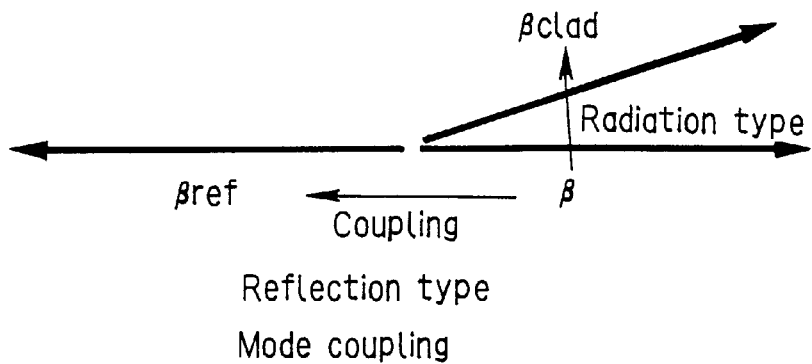
FIG. 1 is an illustrative view showing mode coupling between typical reflection and radiation gratings.
Figure 2A:
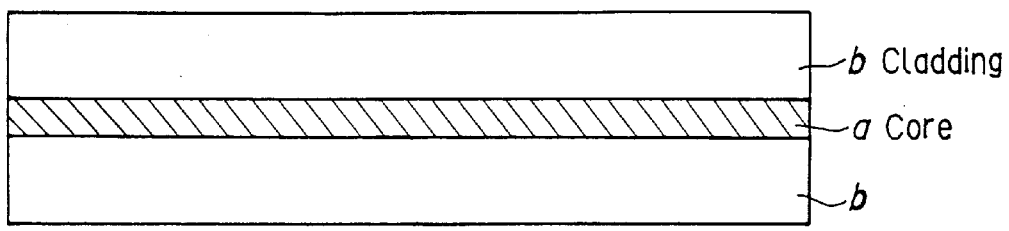
FIGS. 2A and 2B are configurational views illustrating a wavelength filter.
Figure 2B:
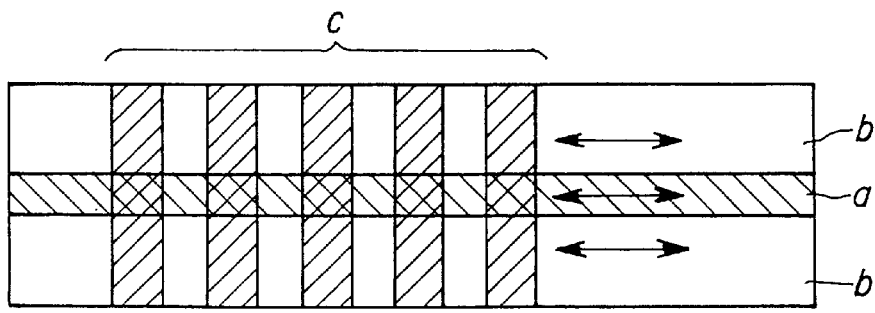

Thus, for the waveguide filter of the embodiment, a grating structure is formed in such a manner that the effective refractive index of the waveguide core is periodically varied by changing the shape of the waveguide at regular intervals in the beam propagating direction without changing the intrinsic refractive index of the waveguide core. Therefore, it is possible to produce a grating within the producing stage of the waveguide, without requiring a different step in which a grating is formed by the irradiation of ultraviolet light after the production of the waveguide as performed in the conventional waveguide filter shown in FIG. 1. As a result, the grating can be formed at the same time as the waveguide is produced, without needing to irradiate with ultraviolet light to form a grating in the waveguide.

Although in the above embodiment, the waveguide width is made to vary in a rectangular waveform arrangement, in the actual process, the width may be made to vary in a trigonometric functional manner. Alternatively, a technique involving cutting the waveguide may be used.

Here, 'varying in a trigonometric functional manner' means a sinusoidal variation, for instance. 'Cutting the waveguide' involves a plurality of slits formed through the core at intervals of an arbitrary distance along planes which are perpendicular to the beam propagating direction in the core of the waveguide to form an intermittent configuration.

Here, the 'effective refractive index' is determined from effective wave equations. That is, when the shape etc. of the core varies two dimensionally, or in the x-direction and y-direction as in a planar waveguide, the wave equations obtained from this geometry are taken to be as if they were obtained from a configuration in which the refractive index varies one-dimensionally as in the case of an optical fiber. The thus obtained refractive index is used as the 'effective refractive index'. The variation in the effective refractive index due to the difference in width of the core can be calculated based on the technique of the effective refractive index method, and the results are shown in Table 1 below:

TABLE 1

| Core width and effective refractive index | | |
|---|---|---|
| Core width w($\mu$m) | 6 | 9 |
| Core height t($\mu$m) | 8 | 8 |
| Refractive index of cladding | 1.44466 | 1.44466 |
| Relative refractive index difference of core to cladding | 0.27% | 0.27% |
| Effective refractive index | 1.44976 | 1.45031 |

(wavelength = 1.51 $\mu$m)

Here, the waveguide shown in Table 1, was an example obtained based on the procedural steps from FIGS. 5A–5D having a configuration shown in FIGS. 3A and 3B, the compositions of the core and cladding are as follows: (% represents wt. %).

Figure 6A:
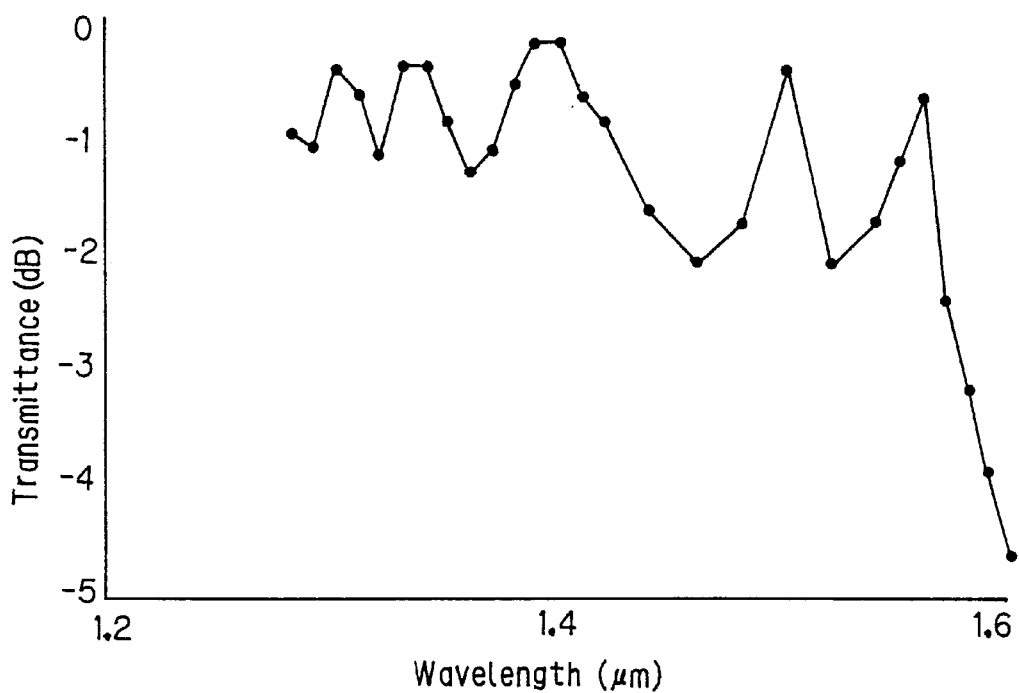
FIG. 6A is a chart showing the effect of the invention, illustrating the calculated results for a specific example of a filter based on the BPM.
Figure 6B:
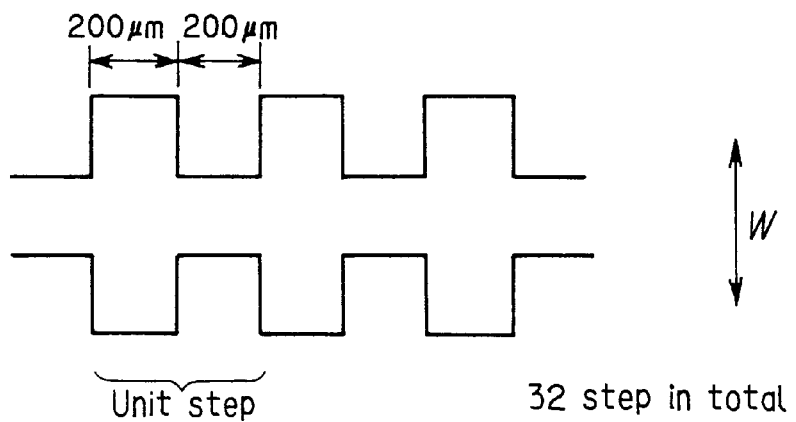
FIG. 6B is an illustration showing the dimensions of the waveguide filter of FIG. 6A.

Core: 4% $GeO_2$, 10% $B_2O_3$, 5% $P_2O_5$, $SiO_2$ (silica) for almost all of the remaining part Cladding: 20% $B_2O_3$, 10% $P_2O_5$, $SiO_2$ (silica) for almost all of the remaining part Next, when a grating filter with its core width varying in the longitudinal direction is considered, the refractive index varies with approximately $1\times10^{-3}$. The filtering characteristics of this grating can be calculated by the 2DBPM (2-dimensional beam propagation method). The result is shown in FIG. 6A. In this case, as shown in FIG. 6B, the waveguide has, in total, 32 branches 12b of 200 $\mu$m long in the beam propagating direction, spaced 200 $\mu$m between adjacent branches 12b.

Figure 7:
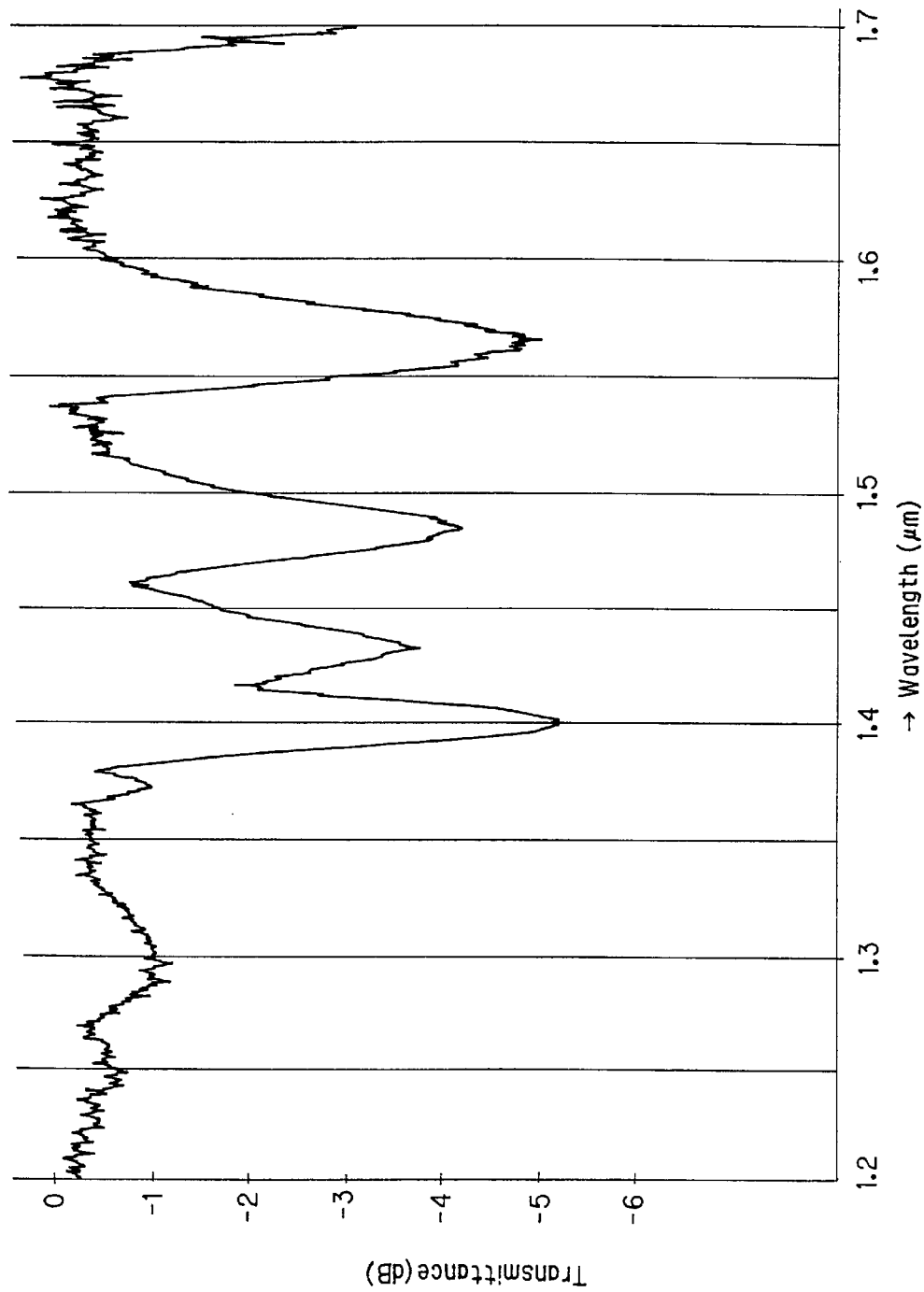
FIG. 7 is a chart illustrating the filtering characteristics of a grating filter of an example of the invention.

From the above conditions, grating filters were produced in practice, and the filtering characteristics as shown in FIG. 7 were obtained. Since this filter has a rejection of about 5 dB (grating length =9 mm) as seen in FIG. 7, it is understood that this filter can be put into practical use for adjusting gains of optical amplifiers.

Although in the above embodiment the present invention has been applied to a radiation grating, it is also possible to apply it to refection gratings because this invention essentially uses the principle that the refractive index is effectively made to vary in the longitudinal direction by changing the shape of the waveguide in the same direction.

As has been described, in accordance with the invention, it is possible to produce gratings using the normal process for producing waveguides. As a result, no extra process is needed for the production of the grating, thereby the time for the fabrication can be markedly reduced.

The processing accuracy of the grating falls within 1 $\mu$m, which is 5 to 10 times as precise as in the case where gratings are fabricated by using ultraviolet irradiation.

No damage is caused because of the omission of the ultraviolet irradiating process, therefore the material for the substrate such as silica does not need to be selected so strictly. Hence, this results in a wide variation of material which can be selected.

Since the shape of the grating can be modified by changing the shape of the mask, the controllability is high compared to the case where ultraviolet irradiation is used, thus making it possible to produce a free shape of waveguide.

Further, the ability to reproduce identical products is theoretically almost 100%, this means that filters showing good performances can be produced at a high yield.

What is claimed is:

1. A production process of an optical waveguide filter whereby a planar waveguide is produced by forming an optical waveguide along a substrate, said production process comprising:

an optical waveguide forming step for creating a core to be an optical waveguide having a grating structure in which the width of the core is varied periodically in the beam propagating direction; and a waveguide embedding step for covering the formed core with a cladding having a lower refraction index than the core so as to allow the core to be an optical waveguide, said process further comprising the steps of:

using a Si-wafer as the substrate;

depositing glass soot on the wafer by flame hydrolysis deposition (FHD);

sintering the deposited glass soot to form a cladding glass layer;

forming a Si-resist film over the cladding glass layer by Ar-sputtering deposition;

forming a core pattern by photolithography;

forming a core by reactive ion etching (RIE); and filling a cladding around and over the core to embed the core by the same FHD and sintering process.

2. A production process of an optical waveguide filter whereby a planar waveguide is produced by forming an optical waveguide along a substrate, said production process comprising:

an optical waveguide forming step for creating a core to be an optical waveguide having a grating structure in which the width of the core is varied periodically in the beam propagating, direction; and a waveguide embedding step for totally covering the formed core with a cladding having a lower refraction index than the core so as to allow the core to be an optical waveguide, wherein the optical waveguide has a grating structure in which the width of the waveguide is varied periodically in a rectangular waveform arrangement in the beam propagating direction.

3. A production process of an optical waveguide filter whereby a planar waveguide is produced by forming an optical waveguide along a substrate, said production process comprising:

an optical waveguide forming step for creating a core to be an optical waveguide having a grating structure in which the width of the core is varied periodically in the beam propagating direction; and a waveguide embedding step for totally covering the formed core with a cladding having a lower refraction index than the core so as to allow the core to be an optical waveguide, wherein the optical waveguide has a grating structure in which the width of the waveguide is varied sinusoidally in a trigonometric functional manner in the beam propagating direction.

4. A production process of an optical waveguide filter whereby a planar waveguide is produced by forming an optical waveguide along a substrate, said production process comprising:

an optical waveguide forming step for creating a core to be an optical waveguide having a grating structure in which the width of the core is varied periodically in the beam propagating direction; and a waveguide embedding step for totally covering the formed core with a cladding having a lower refraction index than the core so as to allow the core to be an optical waveguide, wherein, in forming the grating structure having a core to be an optical waveguide, the core of the waveguide is cut through by forming a plurality of slits along planes which are perpendicular to the beam propagating direction, at intervals of an arbitrary distance to form an intermittent configuration.

5. A production process of an optical waveguide filter whereby a planar waveguide is produced by forming an optical waveguide along a substrate, said production process comprising:

an optical waveguide forming step for creating a core to be an optical waveguide having a grating structure in which the width of the core is varied periodically in the beam propagating direction; and a waveguide embedding step for totally covering the formed core with a cladding having a lower refraction index than the core so as to allow the core to be an optical waveguide, wherein the grating structure formed is of radiation type.

6. A production process of an optical waveguide filter whereby a planar waveguide is produced by forming an optical waveguide along a substrate, said production process comprising:

an optical waveguide forming step for creating a core to be an optical waveguide having a grating structure in which the width of the core is varied periodically in the beam propagating direction; and a waveguide embedding step for totally covering the formed core with a cladding having a lower refraction index than the core so as to allow the core to be an optical waveguide, wherein the grating structure formed is of reflection type wherein the mode that propagates in the positive direction through the core is coupled with the mode that propagates in the negative direction.

7. A production process of an optical waveguide filter according to claim 5, wherein the refractive index varies periodically at intervals on the order of 1 $\mu$m.

8. A production process of an optical waveguide filter according to claim 6, wherein the refractive index varies periodically at intervals on the order of a few hundred micrometer.

* * * * *